(12) United States Patent
Yahagi et al.

(10) Patent No.: US 12,066,698 B2
(45) Date of Patent: Aug. 20, 2024

(54) OPTICAL ISOLATOR

(71) Applicant: SHIN-ETSU CHEMICAL CO., LTD., Tokyo (JP)

(72) Inventors: Akira Yahagi, Takasaki (JP); Masanori Ikari, Takasaki (JP); Takuto Matsumoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 607 days.

(21) Appl. No.: 17/285,051

(22) PCT Filed: Oct. 2, 2019

(86) PCT No.: PCT/JP2019/038848
§ 371 (c)(1),
(2) Date: Apr. 13, 2021

(87) PCT Pub. No.: WO2020/085017
PCT Pub. Date: Apr. 30, 2020

(65) Prior Publication Data
US 2022/0146866 A1 May 12, 2022

(30) Foreign Application Priority Data

Oct. 23, 2018 (JP) ................. 2018-198964

(51) Int. Cl.
*G02F 1/09* (2006.01)
*C04B 35/50* (2006.01)
(Continued)

(52) U.S. Cl.
CPC .............. *G02F 1/093* (2013.01); *C04B 35/50* (2013.01); *G02F 1/0136* (2013.01); *G02F 1/055* (2013.01)

(58) Field of Classification Search
CPC ........ G02F 1/093; G02F 1/0136; G02F 1/055; C04B 35/50
(Continued)

(56) References Cited

U.S. PATENT DOCUMENTS

2013/0222909 A1    8/2013    Makikawa et al.
2014/0160565 A1    6/2014    Rogers et al.
(Continued)

FOREIGN PATENT DOCUMENTS

CN      103364972 A    10/2013
CN      104145209 A    11/2014
(Continued)

OTHER PUBLICATIONS

Jun. 22, 2022 Search Report issued in European Patent Application No. 19877050.5.
(Continued)

*Primary Examiner* — William Choi
(74) *Attorney, Agent, or Firm* — Oliff PLC

(57) ABSTRACT

An optical isolator includes a Faraday rotator including a trivalent ion exchange TAG (terbium-aluminum garnet), and arranged around the Faraday rotator, a central hollow magnet and a first and a second hollow magnet units arranged to sandwich the central hollow magnet in an optical axis direction. A magnetic flux density B [T] in the Faraday rotator and an optical path length L [mm] where the Faraday rotator is arranged satisfy $0 < B$             (1) and $14.0 \leq L \leq 24.0$          (2).

The optical isolator, compared with a conventional Faraday rotator such as a terbium-gallium garnet (TGG) crystal,
(Continued)

contributes to reduction of a thermal lensing effect, being a pending problem, in a high-output fiber laser.

7 Claims, 2 Drawing Sheets

(51) Int. Cl.
  *G02F 1/01* (2006.01)
  *G02F 1/055* (2006.01)
(58) Field of Classification Search
  USPC .......................................................... 359/281
  See application file for complete search history.

(56) References Cited

U.S. PATENT DOCUMENTS

| 2014/0300963 A1 | 10/2014 | Yahagi et al. |
| 2016/0201222 A1 | 7/2016 | Ikari |

FOREIGN PATENT DOCUMENTS

| CN | 107619273 A | 1/2018 |
| JP | S61-114420 U | 7/1986 |
| JP | 2002-293693 A | 10/2002 |
| JP | 2008-007385 A | 1/2008 |
| JP | 2012-082079 A | 4/2012 |
| JP | 2012-083381 A | 4/2012 |
| JP | 2015-108726 A | 6/2015 |
| JP | 2016-109743 A | 6/2016 |
| JP | 2016-180858 A | 10/2016 |
| JP | 2017-032639 A | 2/2017 |
| JP | 2017-090538 A | 5/2017 |
| JP | 2017-137223 A | 8/2017 |
| WO | 2015/037649 A1 | 3/2015 |

OTHER PUBLICATIONS

Jun. 29, 2022 Office Action issued in Chinese Patent Application No. 201980069289.3.
Apr. 27, 2021 International Preliminary Report on Patentability issued in International Application No. PCT/JP2019/038848.
May 24, 2022 Notification of Reasons for Refusal issued in Japanese Patent Application No. 2018-198964.
Aug. 11, 2023 Office Action issued in Canadian Patent Application No. 3,115,034.
Sep. 13, 2022 Office Action issued in Japanese Patent Application No. 2018-198964.
Nov. 16, 2021 Office Action issued in Japanese Patent Application No. 2018-198964.
Dec. 17, 2019 International Search Report issued in International Patent Application No. PCT/JP2019/038848.
Kizaki et al., "Growth of Large TSLAG Single Crystal for Optical Isolator," Journal of the Japanese Association for Crystal Growth, 2015, vol. 42, No. 2, p. 156-160.
Aung, Yan Lin et al., "Development of optical grade (TbxY1-x)3Al5O12 ceramics as Faraday rotator material," Journal of the American Ceramic Society, 2017, vol. 100, Issue 9, p. 4081-4087.
Feb. 3, 2023 Office Action issued in Chinese Patent Application No. 201980069289.3.
Dec. 12, 2023 Office Action issued in Japanese Patent Application No. 2022-196570.
Apr. 17, 2024 Office Action issued in European Patent Application No. 19877050.5.
Apr. 2, 2024 Office Action issued in Japanese Patent Application No. 2022-196570.

OPTICAL ISOLATOR

TECHNICAL FIELD

The present invention relates to an optical isolator.

BACKGROUND ART

Fiber lasers have characteristics that a 1-μm band light oscillated by a laser diode (LD) light source is transmitted by a fiber doped with a rare earth element such as ytterbium (Yb), and amplified by a pumped LD so that fiber output of a high-precision and high-output laser beam is possible. Fiber lasers are attracting attention for having advantages such as low power consumption and long life, since the conversion efficiency of excitation light is high and there is little need for cooling, and lamp pumping is unnecessary compared with a lamp-pumped YAG laser of the same wavelength band.

Fiber lasers are broadly divided into two groups by oscillation form, and there are continuous oscillation CW fiber lasers and pulse fiber lasers. Processing purposes are also broadly divided by this difference in oscillation form. CW fiber lasers, whose strong point is thermal processing are mainly used for cutting and welding, and pulse fiber lasers are mainly used for surface processing such as marking and scribing, which require non-thermal processing. In recent years, there has been a movement to raise the power of pulse fiber lasers to 100 W or more to apply for use in processing that require fine drilling and cutting of semiconductor materials and glass window materials.

A typical oscillation mode of a pulse fiber laser is a mode of separating a high-stability master oscillator (or seed light) for generating a high-quality beam called Master Oscillator Power Amplifier (MOPA) and a high-output light amplifier, and controlling each independently. A characteristic of this mode is that a high output can be achieved while maintaining favorable beam characteristics. On the other hand, regarding return light (reflected light) from the material to be processed such as metal, the return light itself becomes amplified due to the features of the mode, and there is a risk of damaging and breaking the master oscillator (seed light). Therefore, for stable operation of a pulse fiber laser, it is necessary to cut off the return light of the reflected light from an optical fiber in the direction of the light-emitting light source by arranging an optical isolator having a one-way light transmission function (light in a forward direction is transmitted, and light in a reverse direction is cut off) between the seed light and the body to be processed in order to prevent the reflected light from returning to the seed light, being the light-emitting light source.

Here, an optical isolator is mainly configured from three components: a Faraday rotator; polarizers arranged on the incident and outgoing sides of the Faraday rotator; and a magnet for applying a magnetic field in a light transmission direction (optical axis direction) of the Faraday rotator. When light enters the Faraday rotator in this configuration, a phenomenon where a plane of polarization rotates in the Faraday rotator occurs. This is a phenomenon called a Faraday effect, the angle by which the plane of polarization rotates is called a Faraday rotation angle, and the degree θ thereof is expressed by the following formula.

$$\theta = V \times H \times L$$

V is a Verdet constant, which is a constant that is determined by the material and measuring wavelength of the Faraday rotator, H is the size of the magnetic field, and L is the length of the Faraday rotator. As seen from the formula, when attempting to achieve a desired Faraday rotation angle in a rotator having a Verdet constant of a certain size, the larger the magnetic field, the shorter the rotator length can be, and the longer the rotator length, the smaller the magnetic field can be.

In addition, generally, to achieve the functions of an optical isolator, a Faraday rotation angle of about 45 degrees is necessary. Specifically, light that enters an optical isolator has the plane of polarization thereof rotated by the Faraday rotator by 45 degrees, and is transmitted through incident- and outgoing-side polarizers whose angles have been adjusted. Meanwhile, the return light has the plane of polarization thereof rotated by 45 degrees in a reverse direction using the non-reciprocity of the Faraday rotator, and comes to have a plane of polarization at right angles of 90 degrees to the incident-side polarizer, and cannot be transmitted. Optical isolators use this phenomenon to prevent return light from occurring.

Patent Document 1 discloses using $(Tb_xY_{1-x})_2O_3$ (x=0.6 to 1.0) as a Faraday rotator to make the magnet shape compact and to shorten the Faraday rotator (7.0≤L≤11.0 mm), and insertion loss being 1.0 dB or less.

In addition, Non Patent Document 1 discloses that a fine ceramic sintered body having the composition $(Tb_xY_{1-x})_3Al_5O_{12}$ (x=0.5 to 1.0) has a high extinction ratio (the existing 35 dB was improved to 39.5 dB or more) compared with an existing TGG crystal, and that it is also possible to reduce insertion loss (the existing 0.05 dB was improved to 0.01 to 0.05 dB).

CITATION LIST

Patent Literature

Patent Document 1: JP 2012-83381 A
Patent Document 2: JP S61-114420 U

Non Patent Literature

Non Patent Document 1: Yan Lin Aung, Akio Ikesue, Development of optical grade $(Tb_xY_{1-x})_3Al_5O_{12}$ ceramics as Faraday rotator material, J. Am. Ceram. Soc., (2017), 100(9), 4081-4087

SUMMARY OF INVENTION

Technical Problem

The Verdet constant of a conventional Faraday rotator using, for example, a terbium-gallium garnet (TGG) crystal is about 37 Rad/T·m at a wavelength of 1.06 μm. Therefore, the length of the Faraday rotator that satisfies a Faraday rotation angle of 45 degrees needs to be about 20 mm (2.0 cm). In addition, since the absorption coefficient at the same wavelength is 0.0015 to 0.0020 $cm^{-1}$, absorption loss, which affects a thermal lensing effect, is 0.03 to 0.04 dB (0.7 to 1.0%). As a result, in a pulse fiber laser with an average output of 100 W or more, the beam waist position of the output beam is changed by the thermal lensing effect caused by the optical isolator. As a result, this brings about change in beam diameter at the portion to be processed, and therefore, high-precision processing has been difficult.

Demands for lower loss (lower absorption) in optical isolators mounted in fiber laser processors in recent years, in particular, pulse fiber lasers with an average output of 100 W or more have been growing. Thus, a material used as the Faraday rotator of the above-described optical isolator is required to have a Faraday effect roughly equivalent to that of a TGG, being a conventional material, and a low absorption coefficient caused by thermal lensing.

That is, if a configuration of a Faraday rotator having a lower absorption coefficient is possible while the Verdet constant of the Faraday rotator, which affects the isolator shape (size) is roughly the same size as the TGG, being a conventionally used material, it becomes possible to provide an optical isolator compatible with a high power light of 100 W or more without changing the size from the conventional configuration. Therefore, this becomes the most practical solution in laser device development.

In addition, present pulse fiber lasers with a purpose for a wider range of processing continue to have higher output, and optical isolators to be mounted are required to have characteristics of lower loss. Accordingly, even lower loss characteristics than those of the optical isolator disclosed in Patent Document 1 are required. In addition, there is a situation that demands for developing a Faraday rotator with a low thermal lensing effect for realizing high-precision processing are rising.

Here, thermal lensing is a phenomenon where a change in refractive index occurs in a Faraday rotator material due to generation of heat when a high power laser beam of, for example, 100 W enters the material, and lensing occurs. When a thermal lens occurs, a change in beam focal position occurs at the object to be processed, and it becomes difficult to process the material favorably. That is, the longer the thermal lens (unit: m), the lower the thermal lensing, and the more suitable for processing.

Non Patent Document 1 discloses that insertion loss can also be reduced. However, generally, reduction of insertion loss can also be achieved by reduction of scattering sources such as different phases and bubbles, and it is unclear whether the low loss in the Document was realized by achieving an absorption coefficient of 0.001 cm$^{-1}$ or less with an optical path length of 24 mm or less.

Presently, neither a precedent where a new material is processed as a Faraday rotator and further combined with a magnet unit in a carbon steel casing and then set up as an optical isolator to determine the absorption coefficient at an optical path length of 24 mm or less, nor a precedent where an optical isolator is mounted in a pulse fiber laser of 100 W or more and stable operation is confirmed can be found.

The present invention has been made to solve the above-described problems, and an object thereof is to provide an optical isolator that, compared with a conventional Faraday rotator such as a terbium-gallium garnet (TGG) crystal, contributes to reduction of a thermal lensing effect, being a pending problem, in a high-output fiber laser.

Solution to Problem

The present invention has been made to achieve the object, and provides an optical isolator comprising a Faraday rotator comprising a trivalent ion exchange TAG (terbium-aluminum garnet), and arranged around the Faraday rotator, a central hollow magnet and a first and a second hollow magnet units arranged to sandwich the central hollow magnet in an optical axis direction, wherein a magnetic flux density B [T] in the Faraday rotator and an optical path length L [mm] where the Faraday rotator is arranged satisfy $0<B$ (1) and $14.0 \leq L \leq 24.0$ (2).

Such an optical isolator can be made compact, and a thermal lensing effect can be reduced.

In this event, the Faraday rotator can comprise a single crystal or a ceramics material represented by the following formula (3), $$(Tb_X Re_{1-X})_3(Al_{1-y}Q_y)_5O_{12}$$ (3)

wherein x=0.6 to 0.95 and y=0 to 0.4, Re comprises at least one element selected from lanthanoids other than scandium, yttrium, and terbium (Tb), and Q comprises at least one element selected from scandium and gallium.

In this manner, the thermal lensing effect can be further reduced.

In this event, the Faraday rotator can be a ceramics material.

In this manner, it is possible to produce at low costs.

In this event, the magnetic flux density B [T] in the Faraday rotator can be a magnetic flux density that satisfies $0<B \leq 1.7$.

In this manner, the optical isolator can be made more compact.

In this event, the Faraday rotator can have optical characteristics of an absorption coefficient of 0.001 cm$^{-1}$ or less and an extinction ratio of 25 dB or more at an optical path length of L 24.0 mm.

In this manner, the optical isolator can be given optical characteristics of lower loss and higher isolation.

In this event, the central hollow magnet and the first and the second hollow magnet units can be mounted in a carbon steel casing.

In this manner, the adhesion or the attraction of the magnets can be increased.

Advantageous Effects of Invention

As described above, the inventive optical isolator uses a Faraday rotator that, compared with a conventional Faraday rotator such as a terbium-gallium garnet (TGG) crystal, has a similar Verdet constant while having roughly half the absorption coefficient and a magnetic material and a magnetic circuit with a high magnetic flux density. This makes the use of an optical isolator to be mounted for use in a high-output fiber laser possible. In addition, the optical isolator can be made compact and can contribute to reduction of a thermal lensing effect, being a pending problem, in a high-output fiber laser.

DESCRIPTION OF EMBODIMENTS

Hereinafter, the present invention will be described in detail, but the present invention is not limited thereto.

As described above, an optical isolator that is compact and contributes to the reduction of a thermal lensing effect has been desired.

The present inventors have earnestly studied the above-described problems and found out that an optical isolator comprising a Faraday rotator comprising a trivalent ion exchange TAG (terbium-aluminum garnet), and arranged around the Faraday rotator, a central hollow magnet and a first and a second hollow magnet units arranged to sandwich the central hollow magnet in an optical axis direction, wherein a magnetic flux density B [T] in the Faraday rotator and an optical path length L [mm] where the Faraday rotator is arranged satisfy $$0<B \quad (1) \text{ and}$$

$$14.0 \le L \le 24.0 \quad (2).$$

allows an optical isolator that is compact and has a lowered thermal lensing effect, and completed the present invention.

Hereinafter, a description will be given with reference to the drawings.

Firstly, the outline of the optical isolator will be given.

Figure 1:
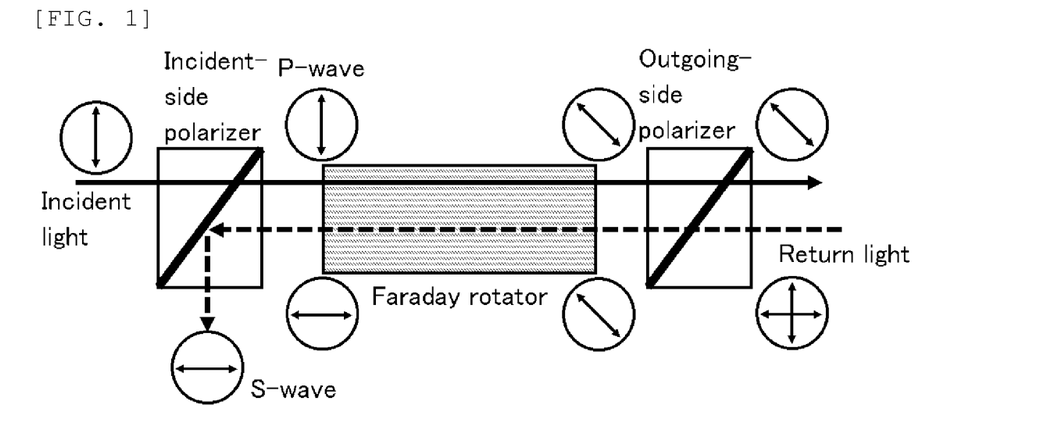
FIG. 1 shows the behavior of polarization states of an incident light and a return light in an optical isolator.

The behavior of polarization states of an incident light and a return light in an optical isolator is shown schematically in FIG. 1.

A P-wave of the incident light is transmitted with the plane of polarization of an incident-side polarizer. This polarized beam has the plane of polarization thereof rotated by the Faraday rotator by 45 degrees. Furthermore, the P-wave polarized beam then enters an outgoing-side polarizer, is rotated by 45 degrees, and is transmitted, exhibiting a function of polarization dependency.

Meanwhile, when the return light enters the outgoing-side polarizer, the P-wave polarized beam that was transmitted through the outgoing-side polarizer enters the Faraday rotator. In this event, the P-wave polarized beam is rotated by 45 degrees in the opposite direction to the polarization rotation direction of the incident light due to the non-reciprocity of the Faraday rotator. As a result, at the incident-side polarizer, the plane of polarization of the return light becomes S-polarized, and therefore, the beam is reflected at the incident-side polarizer surface, and does not return to the position of incidence. In this manner, the optical isolator functions as a polarization-dependent optical isolator.

Figure 2:
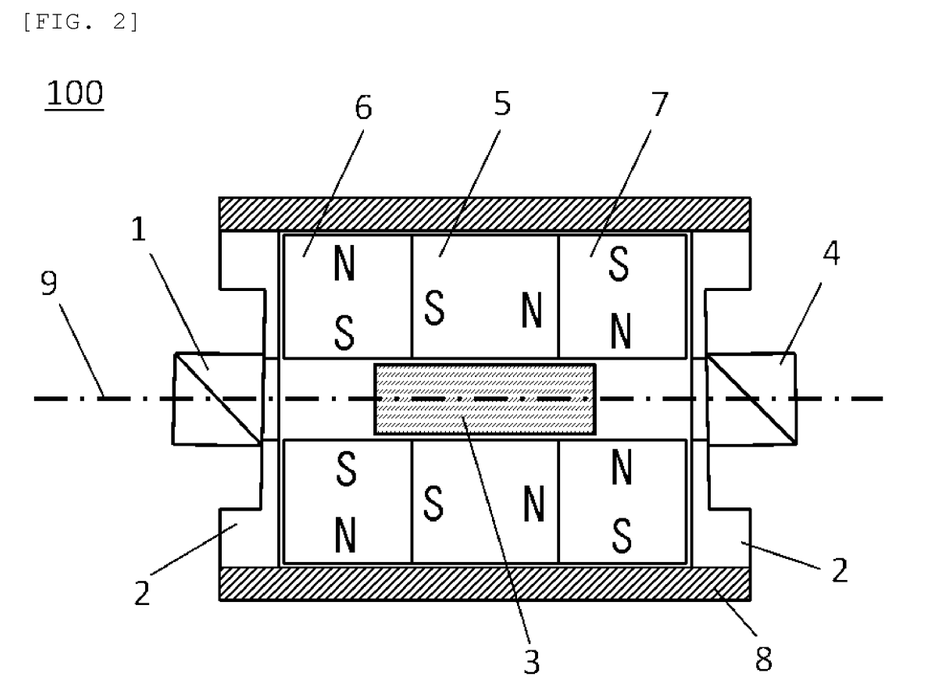
FIG. 2 shows a schematic cross-sectional view of a configuration example of the optical isolator according to the present invention.

FIG. 2 shows a schematic cross-sectional view of a configuration example of the optical isolator 100 according to the present invention.

In FIG. 2, an incident-side polarizer 1, a Faraday rotator 3, and an outgoing-side polarizer 4 are successively arranged on an optical axis 9 running from the incident side to the outgoing side.

The incident-side polarizer 1 is fixed by a polarizer holder 2 at the incident side, and the outgoing-side polarizer 4 is fixed by a polarizer holder 2 at the outgoing side.

Around the Faraday rotator 3 are arranged a central hollow magnet 5, and sandwiching the central hollow magnet 5 in an optical axis direction, a first hollow magnet unit 6 at the incident side and a second hollow magnet unit 7 at the outgoing side. The Faraday rotator 3 is positioned at the center of the hollow part of the central hollow magnet 5, and is fixed in a position where the magnetic field distribution formed by the combination of all the magnets of the central hollow magnet 5, the first hollow magnet unit 6, and the second hollow magnet unit 7 becomes maximum.

The polarizer holders 2 at the incident side and the outgoing side, the central hollow magnet 5 having the Faraday rotator 3 arranged inside, the first hollow magnet unit 6, and the second hollow magnet unit 7 are stored inside an outer casing 8.

(Polarizer)

In an optical isolator used particularly suitably for a high-output fiber laser, each component preferably has resistance to high power light, and a polarization-dependent optical isolator that uses linear polarization in a spatial system is preferable.

In the inventive optical isolator, the incident-side polarizer 1, and the outgoing-side polarizer 4 are not particularly limited, but a polarization beam splitter (hereinafter, referred to as PBS) is the most suitable. The function of the polarization beam splitter is to transmit the incident linearly polarized light when the incident linearly polarized light is a P-polarized light (Tp), and reflect the incident linearly polarized light when the incident linearly polarized light is an S-polarized light (Ts).

Common PBSs for low power include a PBS obtained by bonding two triangular cubes with an adhesive or the like to form a cube shape, the triangular cubes having a PBS on the surface to be bonded. However, for use with a high-output light with an average output of several ten W or more, an optical contacted type that is bonded optically without adhesives is suitable for avoiding optical damage at the bonded surfaces of the triangular cubes. In addition, a single-plate type having a PBS film on the surface can also achieve a similar transmission loss and extinction characteristics to those of a cube type PBS by being tilted relative to the incident beam, and is therefore used for similar high-output lasers. Any type can be appropriately selected according to various laser designs regarding handling of the reflected beam, for example.

To achieve polarization dependency, a polarization-dependent optical isolator is configured by arranging two PBSs so that the polarized light entering the PBSs becomes a P-polarized light (Tp), and arranging between the PBSs a Faraday rotator having a Faraday rotation angle of 45 degrees at a wavelength in the range of 1.0 to 1.1 μm and a magnet around the Faraday rotator to provide a magnetic field in the optical axis direction of the Faraday rotator.

(Magnet Magnetic Circuit)

A magnet magnetic circuit will be described.

In the inventive optical isolator, a central hollow magnet 5, a first hollow magnet unit 6, and a second hollow magnet unit 7 are arranged around a Faraday rotator 3. The first hollow magnet unit 6 and the second hollow magnet unit 7 are arranged at either end of the central hollow magnet 5 so that the magnetic field polarity directions are opposite to one another (so that the same magnetic poles face one another), as described in Patent Document 2.

Generally, in an optical isolator, it is preferable to arrange magnets so that the magnetic flux density where the Faraday rotator is positioned becomes high. For example, in Patent Document 1, hollow magnet units each formed from four magnets are arranged in the positions of the first and the second hollow magnet units in the present invention. Such a configuration makes it possible to increase the magnetic flux density.

Accordingly, the magnet configuration of the present invention is also compatible with a Faraday rotator material that has a smaller Verdet constant than a TGG and requires an even higher magnetic flux density, and therefore, the outer diameter and the length of the magnet units were considered.

Figure 3:
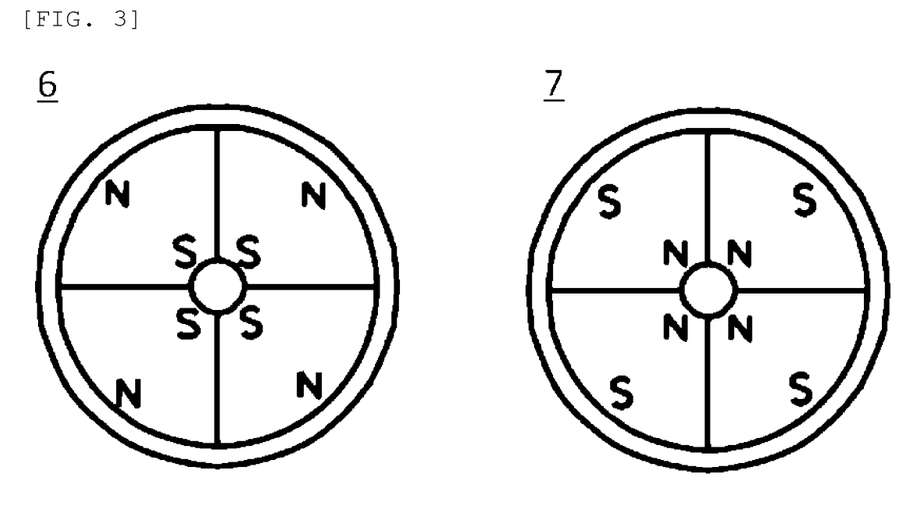
FIG. 3 shows cross-sectional views of a first and a second hollow magnet units.

FIG. 3 shows cross-sectional views of the first hollow magnet unit 6 and the second hollow magnet unit 7 used in the inventive optical isolator.

The first hollow magnet unit 6 and the second hollow magnet unit 7 are arranged at either end of the central hollow magnet 5 so as to sandwich the central hollow magnet 5 in the optical axis direction, so that the magnetic field polarity directions are opposite to one another, and in each of the first hollow magnet unit 6 and the second hollow magnet unit 7, the same magnetic poles face one another with the optical axis as the center.

Note that the outer shapes of the central hollow magnet 5, the first hollow magnet unit 6, and the second hollow magnet unit 7 are not particularly limited, and any outer shape is possible, such as cylindrical, square, or polyhedral.

In addition, the magnets used in the optical isolator preferably have as high a magnetic flux density as possible. Therefore, the type of magnet used in the present invention is not particularly limited, but from the viewpoint of exhibiting a high magnetic flux density, it is preferable to use neodymium-iron-boron (NdFeB) type magnet.

In the example shown in FIG. 2, the central hollow magnet 5, the first hollow magnet unit 6, and the second hollow magnet unit 7 have a cylindrical shape with the same outer diameter, and are inserted into an outer casing 8 together with polarizer holders 2 having the same outer diameter as the magnets. The components can be fixed without gaps by fixing the side portions of the polarizer holders 2 with screws, roll pins, or the like. In this manner, no adhesives or the like are required for fixing all the magnets, and a highly reliable mounting becomes possible.

Note that, by adopting a carbon steel casing as the outer casing 8, a yoke material becomes configured around the magnets, and therefore, the adhesion or the attraction of the magnet can be increased.

(Magnetic Flux Density)

A magnetic flux density B [T] in the Faraday rotator of the inventive optical isolator satisfies $$0 < B \quad (1)$$

This is because a magnetic flux density B [T] in the Faraday rotator of 0 or lower does not contribute to Faraday rotation, or reduces the Faraday rotation angle.

Furthermore, the magnetic flux density B [T] preferably satisfies $$0 < B \leq 1.7. \quad$$

This is because when the magnetic flux density B [T] is 1.7 or lower, a more compact optical isolator can be achieved.

(Faraday Rotator)

The Faraday rotator used in the inventive optical isolator includes a trivalent ion exchange TAG (terbium-aluminum garnet). A trivalent ion exchange TAG is a material that has roughly the same Faraday effect as a TGG, being a conventionally used material, while having a lower absorption coefficient.

In such a Faraday rotator, the Verdet constant at a wavelength of 1.0 to 1.1 μm is preferably 33 Rad/T·m or more. More preferably, the Verdet constant at a wavelength of 1.06 μm is 37 Rad/T·m or more. The Faraday rotator preferably has a larger Verdet constant. With a Faraday rotator having such a Verdet constant, the length of the Faraday rotator necessary to make the Faraday rotation angle 45 degrees can be made shorter, and the Faraday rotator is advantageous from the viewpoint of achieving low loss of the optical isolator.

Note that the Verdet constant can be measured by a usual method. Specifically, a predetermined thickness of oxide is cut out, mirror polishing is performed, the Faraday rotator is set inside a permanent magnet with a known magnetic flux density, and the Verdet constant at the desired wavelength (for example, 1.0 to 1.1 μm) is measured. Note that the measurement conditions can be 25±10° C., and the measurement can be performed in the atmosphere.

The shape of the Faraday rotator is not particularly limited, and a triangular prism shape, a quadrangular prism shape, and the like are possible. However, a cylindrical shape is preferable.

The optical path length L [mm] where the Faraday rotator is arranged is within the range of the following expression (2).

$$14.0 \leq L \leq 24.0 \quad (2)$$

This is because: if the length L exceeds 24.0 mm, the length of the Faraday rotator becomes long, and it becomes difficult to lower the loss of the optical isolator; and if less than 14.0 mm, the magnetic flux density for achieving the desired Faraday rotation angle becomes high, and it becomes difficult to make the isolator compact.

In addition, the Faraday rotator used in the inventive optical isolator preferably includes a single crystal or a ceramics material represented by the following formula (3).

$$(Tb_X Re_{1-X})_3(Al_{1-y}Q_y)_5O_{12} \quad (3)$$

Here, x=0.6 to 0.95 and y=0 to 0.4, Re includes at least one element selected from lanthanoids other than scandium, yttrium, and terbium (Tb), and Q includes at least one element selected from scandium and gallium.

In this event, one type of Re can be contained, or a plurality of Re can be contained in any proportion. In particular, from the viewpoint of availability of the raw material, yttrium, gadolinium, lutetium, and scandium are preferable as Re. Yttrium is more preferable.

In addition, one type of Q can be contained, or a plurality of Q can be contained in any proportion. In particular, scandium is more preferable as Q from the viewpoint of stabilizing the garnet structure.

A Faraday rotator containing such materials has a further reduced thermal lensing effect.

The Faraday rotator can contain components other than the oxide represented by the formula (3).

Other components that can be contained in the Faraday rotator include metal oxides selected from a group including an alkaline-earth metal oxide, a group 13 element oxide, a group 14 element oxide, other oxides of a group 4 element, a group 5 element (such as V, Nb, and Ta), a group 6 element (such as Mo and W), and a group 17 element (such as F, Cl, and Br) but are not limited thereto. Furthermore, two or more of the other components can be contained, and the content is preferably 0.000001 to 1.0 mass % of the entire Faraday rotator, more preferably 0.00001 to 0.1 mass %.

The metal oxides are contained, for example, as a dopant added when producing the single crystal or a sintering additive added when producing the ceramics. In addition, a constituent of a crucible, etc. is sometimes mixed in as an accessory component when producing the material for the Faraday rotator.

Note that as the sintering additive, it is preferable to select one or more from oxides of silicon, magnesium, and calcium.

The oxide represented by the formula (3) is preferably a single crystal or ceramics, but ceramics are preferable since synthesis at a low temperature is possible.

When producing a single crystal of an oxide, it is necessary to achieve a high temperature to make the raw material a melt state. For example, the melting point of terbium oxide is about 2,600° C. and the melting point of yttrium oxide is about 2,300° C., and when producing a solid solution of the two, it is necessary to heat to the temperature (similar temperature) indicated in a phase diagram. Therefore, when melting a raw material in a crucible to produce a single crystal in this manner, the choice of crucible is limited to rhenium, tungsten, or an alloy thereof, etc., and there is a problem that production cost rises.

On the other hand, with ceramics, it is not necessary to heat to the melting point thereof, and it is possible to sinter and produce at a temperature 400° C. to 1000° C. lower than the melting point. In addition, it is preferable to select and add a suitable sintering additive when sintering so that densification can be promoted.

As a method for producing a single crystal, a known method can be employed. Examples include a floating zone melt method, a micro-pulling down method, a pulling method, a skull melt method, a Bridgman method, and the like. Regarding these methods, the following have the details: "Advanced Growth Technology and Application of Bulk Single Crystal" (Tsuguo Fukuda, CMC Publishing Co., Ltd., March, 2006); and "Kessho Seicho Handbook (Crystal Growth Handbook)" ("the Japanese Association for Crystal Growth "Kessho Seicho Handbook (Crystal Growth Handbook)" Editorial Board, Kyoritsu Shuppan Co., Ltd., September, 1995".

In producing a single crystal, it is possible to dope an alkaline-earth metal oxide (for example, magnesium, calcium, strontium, or barium) for the purpose of stable crystallization as described above.

As a method for producing ceramics, a conventionally known production method can be appropriately selected and employed. Main production methods include a hot isostatic pressing method, a method of combining a solid phase method and a press forming method, a method of vacuum sintering using cast molding, etc. The details are disclosed in "Single Crystal to Polycrystalline Materials with Optical Grade" by Akio Ikesue, Oyo Butsuri (Applied Physics), volume 75, issue 5, 579-583 (2006), "Current State and the Future of Ceramic Laser Materials" by Takagimi Yanagitani and Hideki Yagi, the Review of Laser Engineering, volume 36, issue 9, 544-548 (2008), etc.

After formation, it is also preferable to perform a degreasing treatment by heating (preferably 400 to 1000° C.). Baking conditions can be an oxygen atmosphere furnace at 1,380 to 1,780° C. and the time can be 1 to 40 hours. In addition, it is also effective to perform a treatment by a hot isostatic pressing (HIP) method after baking to raise transparency further. The treatment temperature is preferably lower than the baking temperature, and can be 1,000 to 1,750° C. In addition, the treatment pressure in this event can be 100 to 200 MPa. The treatment time is not particularly limited, but can be 4 hours or less. A transparent ceramics sinter obtained in this manner still presents a grey appearance due to F center absorption caused by oxygen deficiency, and therefore, it is also effective to perform an annealing treatment in an atmospheric furnace subsequently. The annealing temperature is preferably 1300 to 1700° C., and the treatment time is preferably 3 hours or more.

The Faraday rotator in the inventive optical isolator preferably has optical characteristics of an absorption coefficient of 0.001 cm$^{-1}$ or less and an extinction ratio of 25 dB or more at a length of 24.0 mm or less. A higher extinction ratio is more preferable as long as it is 25 dB or more. The lower limit of the absorption coefficient and the upper limit of the extinction ratio are not particularly limited, but for example, the lower limit of the absorption coefficient can be 0.0001 cm$^{-1}$ and the upper limit of the extinction ratio can be 50 dB.

In addition, a lower insertion loss is preferable as long as it is 0.04 dB or less including the reflection loss of antireflection coatings against air provided on both end surfaces of the Faraday rotator.

Within the above-described ranges, an optical isolator having optical characteristics of lower loss and higher isolation can be achieved.

Note that the optical characteristics such as insertion loss and extinction ratio are measured by a usual method at a predetermined wavelength (the wavelength to be used). Note that the measurement conditions are 25±10° C., and the measurement is performed in the atmosphere.

Furthermore, the Faraday rotator preferably has a transmittance (transmittance of light) of 99% or more at an optical path length of L mm (14.0≤L≤24.0), with a predetermined wavelength, for example, a wavelength of 1.06 μm. A higher transmittance of the Faraday rotator is preferable as long as it is 100% or less.

Here, the transmittance is measured by the intensity of a light with a predetermined wavelength, for example, a wavelength of 1.06 μm when the light is transmitted through a Faraday rotator with a thickness of L cm. That is, transmittance is represented by the following formula.

Transmittance=$(I/Io)\times 100$

Note that in the formula, "I" represents transmitted light intensity (intensity of light that has been transmitted through a sample with a thickness of L cm), and "Io" represents incident light intensity.

When the transmittance of the obtained oxide is not uniform and there is variation in transmittance depending on the measured point, the transmittance of the oxide may be defined as the average transmittance of ten arbitrary points.

The inventive optical isolator can be used favorably for a laser beam with a wavelength range of 1.0 to 1.1 μm. Such lasers include a lamp-pumped YAG laser and a disk laser. In addition, the inventive optical isolator can be used for a laser beam with a wavelength range other than the wavelength range described above.

EXAMPLE

Hereinafter, the present invention will be described in detail with reference to Examples. However, the present invention is not limited thereto.

Example 1

Firstly, an optical isolator similar to the optical isolator shown in FIG. 2 was fabricated.

As an incident-side polarizer and an outgoing-side polarizer, cube-shaped PBSs (polarization beam splitters) were used. These PBSs were provided with antireflection coatings with a center wavelength of 1.06 μm on the transmission surface, and in addition, were mounted in polarizer holders each having a tilt angle of only 1 degree in order to avoid the reflected light of the transmission surface returning to the incident light path. In addition, a Faraday rotator provided with an antireflection coating with a center wavelength of 1.06 μm was placed so as to be positioned in the center of the hollow part of a central hollow magnet, and was fixed in a position where the magnetic field distribution formed by the combination of all the magnets including a first hollow magnet unit and a second hollow magnet unit became maximum.

Next, details of the Faraday rotator fabricated in Example 1 will be described. As the material, transparent ceramics $(Tb_{0.6}Y_{0.4})_3Al_5O_{12}$, being a terbium-containing garnet-type oxide, where x=0.6 and y=0 in the above-described formula (3) were used.

As a method for fabricating the transparent ceramics, a mixed powder of raw material powders ($Tb_4O_7$, $Y_2O_3$, and $Al_2O_3$) was first prepared. Regarding the method for preparing the mixed powder, high-purity powder materials ($Tb_4O_7$, $Y_2O_3$, and $Al_2O_3$) were used, and the purity was set to 99.99 mass % or higher. Note that the terbium oxide is not limited to $Tb_4O_7$, and $Tb_2O_3$ can also be used, but $Tb_4O_7$ was used since $Tb_4O_7$ is excellent from the aspect of cost.

Next, a solvent, a binder, a plasticizer, a lubricant, etc. were added to the obtained mixed powder and wet blending was performed to provide a slurry. In this event, a predetermined amount of sintering additive was added, the obtained slurry was treated with a spray dryer and dried, and then, made into a cylindrical shape by uniaxial press molding.

Subsequently, baking was performed in an oxygen atmosphere furnace. The baking conditions were 1,500° C. and the baking time was 5 hours.

In addition, after the baking, a treatment was performed by a hot isostatic pressing (HIP) method in order to raise transparency further. The treatment temperature was set to 1,300° C., which was lower than the baking temperature. In addition, the treatment pressure in this event was 150 MPa, and the treatment time was 1 hour.

In this manner, a transparent ceramics sinter was obtained. However, the sinter still presented a grey appearance in this state due to F center absorption caused by oxygen deficiency, and therefore, an annealing treatment was subsequently performed in an atmospheric furnace. The annealing temperature was set to 1500° C., and the treatment time was set to 5 hours.

The terbium-containing garnet-type oxide transparent ceramics sinter obtained in this manner was subjected to grinding of the outer periphery and optical polishing of both end surfaces of the cylinder, and an anti-reflection coating against a center wavelength of 1.064 μm was provided on both end surfaces.

The Verdet constant of this sinter was 33.8 Rad/T·m. An optical measurement was performed at the same wavelength of 1.064 μm, and it was revealed that the sinter had characteristics of an insertion loss of 0.03 dB, an absorption coefficient of 0.0007 cm$^{-1}$, and an extinction ratio of 42 dB. Note that the shape of the sample measured in this event had an outer diameter of φ5.0 mm and a length of 24.0 mm.

Example 2

As Example 2, $(Tb_{0.8}Y_{0.2})_3Al_5O_{12}$ ceramics where the composition was x=0.8 and y=0 in the above-described formula (3) were fabricated by the same method as Example 1. The Verdet constant was 45.9 Rad/T·m. In addition, an optical measurement was performed at a wavelength of 1.064 μm, and the insertion loss was 0.03 dB, the absorption coefficient was 0.0008 cm$^{-1}$, and the extinction ratio was 42 dB.

Example 3

As Example 3, $(Tb_{0.95}(Y+Sc)_{0.05})_3(Al_{0.99}Sc_{0.01})_5O_{12}$ ceramics where the composition was x=0.95 and y=0.01 in the above-described formula (3) were fabricated by the same method as Example 1. The Verdet constant was 53.5 Rad/T·m. In addition, an optical measurement was performed at a wavelength of 1.064 μm, and the insertion loss was 0.04 dB, the absorption coefficient was 0.0010 cm$^{-1}$, and the extinction ratio was 40 dB.

Example 4

In Example 4, a Faraday rotator was fabricated by a centrifugal cast molding method as an example of cast molding. A mixed powder of $(Tb_{0.6}(Y+Sc)_{0.4})_3(Al_{0.99}Sc_{0.01})_5O_{12}$ where the composition was x=0.6 and y=0.01 in the above-described formula (3) was prepared. A solvent, a dispersing agent, a binder, etc. were added to this mixed powder, and wet blending was performed to obtain a slurry. This slurry was subjected to solid-liquid separation by centrifugation and supernatant was removed. Then, the solid was dried to obtain a centrifugal cast molded body.

Subsequently, a Faraday rotator was fabricated by the same method as Examples 1 to 3. The Verdet constant was 33.8 Rad/T·m. In addition, an optical measurement was performed at the same wavelength of 1.064 μm, and the insertion loss was 0.03 dB, the absorption coefficient was 0.0003 cm$^{-1}$, and the extinction ratio was 42 dB, and showed the lowest absorption.

Next, regarding the Faraday rotators of Examples 1 to 4, the magnetic flux density at which the Faraday rotation angle (θf) becomes 45 degrees was calculated.

With Examples 1 and 4, the magnetic flux density at which the Faraday rotation angle becomes 45 degrees was calculated from the sample length (24.0 mm) and the Verdet constant 33.8 Rad/T·m, and the required magnetic flux density was about 0.97 [T].

With Example 2, the magnetic flux density at which the Faraday rotation angle becomes 45 degrees was calculated from the sample length (17.0 mm) and the Verdet constant 45.9 Rad/T·m, and the required magnetic flux density was about 1.01 [T].

With Example 3, the magnetic flux density at which the Faraday rotation angle becomes 45 degrees was calculated from the sample length (14.0 mm) and the Verdet constant 53.5 Rad/T·m, and the required magnetic flux density was about 1.05 [T].

As the wavelength band of recent high-power pulse lasers, 1030 nm to 1064 nm is mainstream. In the present invention, an evaluation was conducted in order to consider the wavelength applicability of the Faraday rotation angles. Note that the Faraday rotation angle standard was set to θf: 45±3 degrees at each wavelength.

The Faraday rotators (sample length: 24 mm, outer diameter: φ5.0 mm) of Example 1 and Example 4 achieved θf: 45 degrees at a wavelength of 1.030 μm and θf: 42 degrees at 1.064 μm. Each of the Faraday rotators (sample lengths: 17 mm and 14 mm, outer diameter: φ5.0 mm) of Examples 2 and 3 achieved a Faraday rotation angle of θf: 45 degrees at a wavelength of 1.030 μm and θf: 42 degrees at 1.064 μm as in Example 1, and it was revealed that it was possible to fabricate an isolator compatible to both wavelengths in each case.

Comparative Example

As a Comparative Example, a TGG ($Tb_3Ga_5O_{12}$) ceramic disclosed in Patent Document 1 was fabricated, and the Verdet constant and optical characteristics were measured. As a result, the Verdet constant was 38.5 Rad/T·m. In addition, at a wavelength of 1.064 μm, the insertion loss was 0.04 dB, the absorption coefficient was 0.0015 cm$^{-1}$, and the extinction ratio was 37 dB. Accordingly, when the sample length was set to 20.0 mm, the magnetic flux density required for a Faraday rotation angle of 45 degrees was 1.02 [T].

Meanwhile, in the Comparative Example, the transmittance was 97%, the isolation was 37 dB, and the thermal lensing characteristics were 1.45 [m].

The results of Examples 1 to 4 and the Comparative Example have been summarized in Table 1.

TABLE 1

|  |  | Example 1 | Example 2 | Example 3 | Example 4 | Comparative Example |
|---|---|---|---|---|---|---|
| Faraday rotator | Composition | $(Tb_{0.6}Y_{0.4})_3Al_5O_{12}$ | $(Tb_{0.8}Y_{0.2})_3Al_5O_{12}$ | $Tb_{0.95}(Y+Sc)_{0.05})_3(Al_{0.99}Sc_{0.01})_5O_{12}$ | $(Tb_{0.6}(Y+Sc)_{0.4})_3(Al_{0.99}Sc_{0.01})_5O_{12}$ | $Tb_3Ga_5O_{12}$ |
|  | Verdet constant [Rad/T·m] | 33.8 | 45.9 | 53.5 | 33.8 | 38.5 |
|  | Insertion loss [dB] | 0.03 | 0.03 | 0.04 | 0.03 | 0.04 |
|  | Absorption coefficient [cm$^{-1}$] | 0.0007 | 0.0008 | 0.0010 | 0.0003 | 0.0015 |
|  | Extinction ratio [dB] | 42 | 42 | 40 | 42 | 37 |
|  | Magnetic flux density [T] at which Faraday rotation angle becomes 45 degrees | 0.97 | 1.01 | 1.05 | 0.97 | 1.02 |
|  | θf [°] (1.030 μm) | 45 | 45 | 45 | 45 | 47 |
|  | θf [°] (1.064 μm) | 42 | 42 | 42 | 42 | 44 |
| Optical isolator | Outer diameter φ [mm] | 38 | — | — | 38 | 36 |
|  | Length [mm] | 86 | — | — | 86 | 76 |
|  | Transmittance [%] | 97 | — | — | 97 | 97 |
|  | Isolation [dB] | 43 | — | — | 43 | 37 |
|  | Thermal lensing characteristics [m] | 2.50 | — | — | 2.85 | 1.45 |

Figure 4:
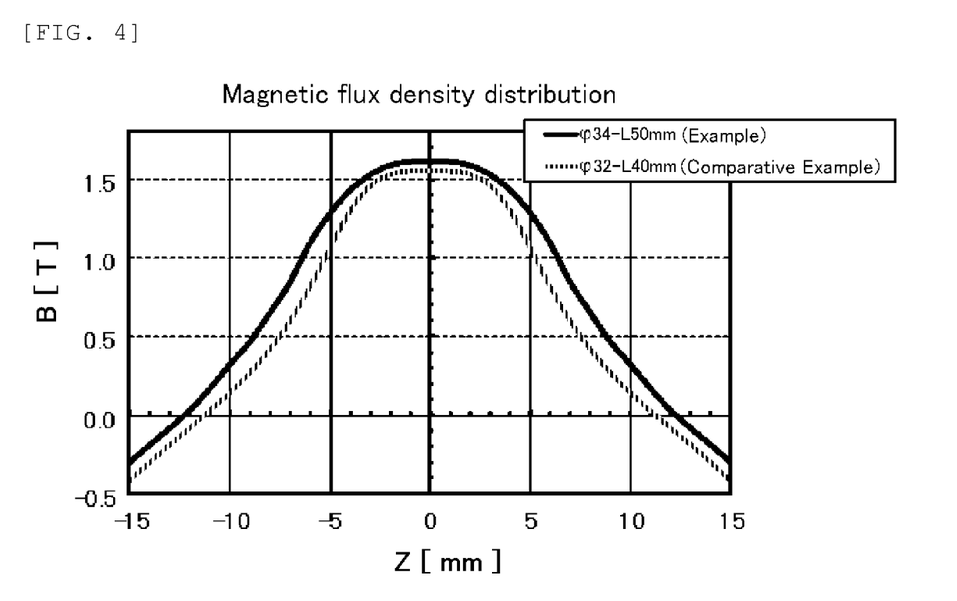
FIG. 4 shows the simulation result showing the magnetic flux density at which the Faraday rotation angle becomes 45 degrees relative to the sample length of the Faraday rotator used in Examples 1 and 4 and Comparative Example 1.

Using the above-described Faraday rotator (sample length: 20 mm, outer diameter: φ5.0 mm) and the magnetic circuit of the Comparative Example shown in FIG. 4, the Faraday rotation angle was measured, and θf: 47 degrees was achieved at a wavelength of 1.030 μm, and θf: 44 degrees at 1.064 μm.

Subsequently, a polarization-dependent optical isolator was fabricated, and the optical isolator had an outer diameter of φ36 mm and a length of 76 mm.

Polarization-dependent optical isolators were fabricated using the Faraday rotators obtained in Examples 1 and 4. As a result, the optical isolators had an outer diameter of o38 mm and a length of 86 mm, and the size reached a level sufficient for mounting in a high-power pulse laser such as a fiber laser or a water-cooling solid-state laser.

Whether or not a high-power pulse laser having an average output exceeding 100 W can be mounted is often judged by performance such as optical characteristics and thermal lensing characteristics. Accordingly, the performance was evaluated in Examples 1 and 4 and the Comparative Example. The used wavelength was 1.030 μm, using a 100-W-3-ps pulse laser.

Note that regarding the thermal lensing characteristics, an actual measurement was performed in cases with and without an isolator, and the thermal lensing characteristics were calculated from the change in the beam waist position of the transmitted beam.

As a result, in Example 1, the transmittance was 97%, the isolation was 43 dB, and the thermal lensing characteristics were 2.50 [m]. Meanwhile, in Example 4, the transmittance was 97%, the isolation was 43 dB, and the thermal lensing characteristics were 2.85 [m].

It was revealed that the optical isolators according to Examples 1 and 4 achieved more favorable isolation characteristics compared with the Comparative Example, while having 1.7 to 2 times the thermal lensing characteristics.

Next, the magnetic flux density distribution of the magnets was determined by a simulation of magnetic field analysis with the outer diameter dimensions of the magnets as the parameter. As the method for analysis, a finite element method (JMAG-Designer) was selected. The material of the magnet was a neodymium-iron-boron (NdFeB) magnet manufactured by Shin-Etsu Chemical Co., Ltd., and the material of the outer casing 8 was carbon steel.

FIG. 4 shows the simulation result of the magnetic field analysis showing the magnetic flux density at which the Faraday rotation angle becomes 45 degrees relative to the sample length of the Faraday rotator used in Examples 1 and 4 and Comparative Example 1.

Here, the Position Z on the horizontal axis indicates the position along the optical axis (the central axis of the hollow part of the hollow magnet), and the 0 position corresponds to the center of the total length of the central hollow magnet and the first and the second hollow magnet units.

The shape of the magnets used in Examples 1 to 4 had an inner diameter of φ5.5 mm, an outer diameter of φ34 mm, and a length of 50 mm, and it is revealed that the magnetic flux density becomes $0.0<B\le1.7$ within the range of 24.0 mm, being the maximum sample length in Examples 1 to 4. As a result, it was revealed that if the length exceeds the upper limit 24.0 mm of the expression (2), the magnetic flux becomes negative, and the Faraday rotation angle is reduced. This indicates that the sample length does not sufficiently exhibit the isolator functions attributable to the Faraday effect, and therefore, the validity of the upper limit 24.0 mm of the expression (2) was successfully confirmed.

On the other hand, the shape of the magnets used in the Comparative Example had an inner diameter of ϕ5.5 mm, an outer diameter of ϕ32 mm, and a length of 40 mm, and the magnetic flux density at the sample length of 20.0 mm was $0.1 \leq B \leq 1.55$. However, the magnetic flux density became negative with a sample length of 22 mm or more, and it was confirmed that a sample length of 20.0 mm was roughly the length upper limit.

As described in detail above, the inventive optical isolator including a low-absorption Faraday rotator that contributes to the reduction of the thermal lensing effect and a magnetic circuit to provide the Faraday rotator with the Faraday effect can contribute to making a 1-μm band high-power pulse laser device compact and stable and providing high performance.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. An optical isolator comprising:
a Faraday rotator comprising a trivalent ion exchange TAG (terbium-aluminum garnet), and
arranged around the Faraday rotator, (i) a central hollow magnet and (ii) a first hollow magnet unit and a second hollow magnet unit each arranged to sandwich the central hollow magnet in an optical axis direction,
wherein:
a magnetic flux density B [T] in the Faraday rotator and an optical path length L [mm] where the Faraday rotator is arranged satisfy:

$0<B$ (1) and $14.0 \leq L \leq 24.0$ (2), the central hollow magnet and the first and second hollow magnets are neodymium-iron-boron (NdFeB) type magnets, and
the Faraday rotator has, at an optical path length of $L \leq 24.0$ mm, optical characteristics comprising:
an absorption coefficient of 0.001 cm$^{-1}$ or less,
an extinction ratio of 25 dB or more, and
a lower insertion loss of 0.04 dB or less.

2. The optical isolator according to claim 1, wherein the Faraday rotator comprises a single crystal or a ceramics material represented by the following formula (3):

$(Tb_xRe_{1-x})_3(Al_{1-y}Q_y)_5O_{12}$ (3)

wherein:
x=0.6 to 0.95,
y=0 to 0.4,
Re comprises at least one element selected from lanthanoids other than scandium, yttrium, and terbium (Tb), and
Q comprises at least one element selected from scandium and gallium.

3. The optical isolator according to claim 2, wherein the Faraday rotator is a ceramics material.

4. The optical isolator according to claim 3, wherein the magnetic flux density B [T] in the Faraday rotator satisfies $0<B \leq 1.7$.

5. The optical isolator according to claim 2, wherein the magnetic flux density B [T] in the Faraday rotator satisfies $0<B \leq 1.7$.

6. The optical isolator according to claim 1, wherein the magnetic flux density B [T] in the Faraday rotator satisfies $0<B \leq 1.7$.

7. The optical isolator according to claim 1, wherein the central hollow magnet, the first hollow magnet unit, and the second hollow magnet unit are mounted in a carbon steel casing.

* * * * *